May 17, 1960 F. K. CHESTNUT, JR., ET AL 2,936,734
SELF-DISPENSING FEEDING STATION
Filed Dec. 13, 1957
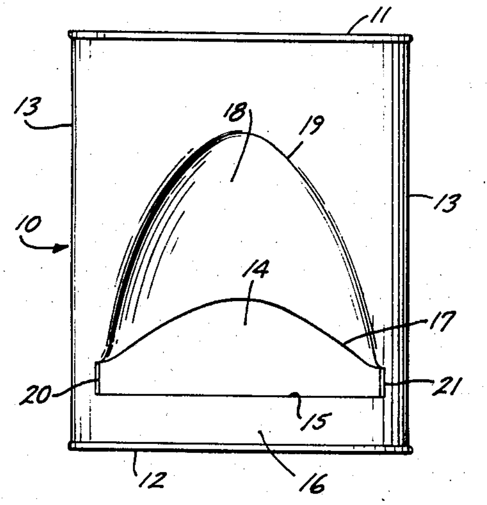
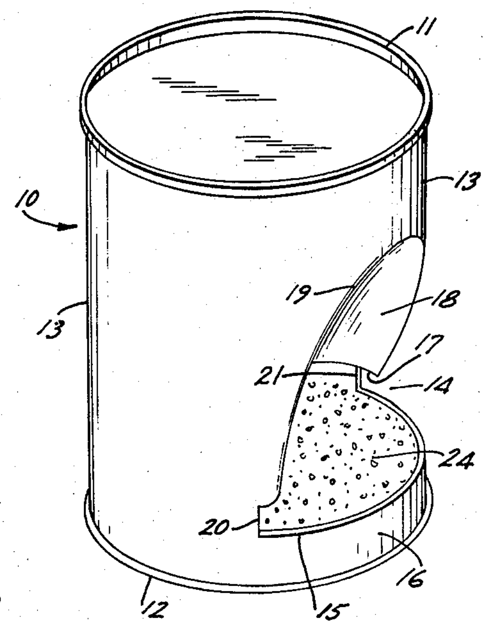
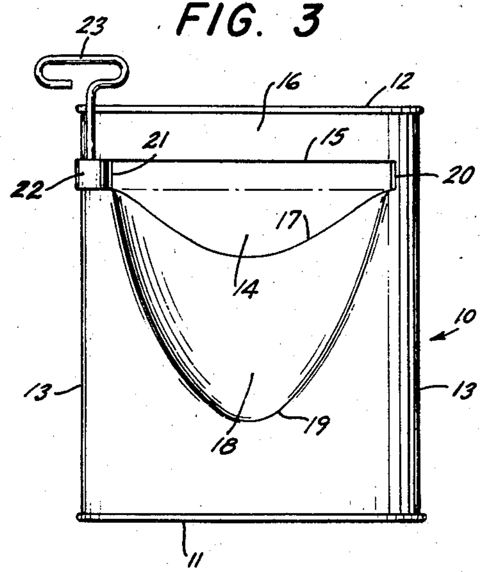
INVENTORS
FRANK K. CHESTNUT, JR.
LAURENCE G. MAYNE 2,936,734
Patented May 17, 1960

2,936,734

SELF-DISPENSING FEEDING STATION

Frank K. Chestnut, Jr., Middleport, and Laurence G. Mayne, Corfu, N.Y., assignors to Food Machinery and Chemical Corporation, New York, N.Y., a corporation of Delaware Application December 13, 1957, Serial No. 702,667

4 Claims. (Cl. 119—52)

This invention relates to a self-dispensing feeding station, a container which is adapted to be converted into a self-dispensing feeding station and to a method of converting a container to a self-dispensing feeding station.

The self-dispensing feeding station of the present invention has wide application and may be used as a feeding station for pets such as cats, dogs, canaries etc. The feeding station is also especially adapted for dispensing bait to rodents such as mice, rats and other household and farmyard pests. The invention will hereinafter be described in connection with its use as a feeding station for rodents but it is not intended to be limited thereto.

The present practice for dispensing rodenticide baits is to either place on the ground material from a pack or cardboard container or to simply break open the cardboard container and let the rodents feed from it. It is obvious from the above that these methods entail considerable waste of the rodenticide bait and also involve considerable handling of the toxic material by the person dispensing the bait. The present invention permits a more efficient use of the toxic bait and also allows for a minimum of handling of the bait by the farmer or householder.

Further objects and advantages of the invention will be apparent from the following description, taken in conjunction with the accompanying drawings, in which:

Fig. 1 is a front elevation of a feeding station embodying the principles of this invention;

Fig. 2 is a view in perspective, similar to that shown in Fig. 1; and

Fig. 3 is front elevation of a preferred embodiment of the invention, showing the container of Fig. 1 before inversion to the position in Fig. 1.

The self-dispensing feeding station of this invention comprises a container, the upper body portion of which is constructed such that a strip of material may be removed by means such as a key thereby forming a space between the top of the container and the body of the container for a certain portion of the circumference of the container. Upon inversion of the container the top becomes the base of the feeding station.

Prior to the inversion of the container the farmer or householder exerts inward pressure with his thumbs on the container thereby causing an indentation in the body portion of the container. This indentation acts as a feed regulator for the feeding station. The size of the indentation will be determined by the extent to which the container has been opened. There is thus a correlation between the length of the opening in the circumference of the container and the size of the indentation in the side of the container. In order to have the device function properly, the correlation between these features must be maintained.

The container may be constructed of any material which will retain the indentation made in the body portion. We have found the tin can which is used in so much other commercial packaging to be particularly suitable. The container may be of any convenient size.

The shape of the container is a matter of choice and convenience, the only requirements being that the shape allow for the indentation and the inversion of the container, however, we prefer to use a round or circular type container.

The container is constructed such that a strip of material which is an integral part of the body portion can be rolled off, by means such as a key, thereby exposing at least a portion of the interior of the can to the atmosphere. During manufacture of the container, the body portion is machined in such a manner that the strip may be readily removed. We have found it essential to unroll the strip to a predetermined point on the can; this is, between one-fourth and five-twelfths the circumference or perimeter of the container. If the container is opened beyond five-twelfths of its circumference or perimeter, the opening becomes too large when inverted and the feed flows without any regulation whatsoever. If the container is opened less than one-fourth of its circumference or perimeter, the space available for feeding is extremely small and the device fails to function adequately.

Referring now to the drawings, wherein like numerals refer to similar parts in the several views, the feeding station comprises a container 10. Said container 10 comprises integral top 11 and bottom 12 ends and vertical connecting sides 13, and is preferably cylindrical and of metal construction.

An aperture 14 is provided in spaced relation to the bottom 12 of container 10. The lower boundary of aperture 14 is formed by the upper edge 15 of an upstanding feed trough portion 16 of the container. The upper boundary of aperture 14 is defined by the lower edge 17 of an inwardly extending arcuate concave surface hopper portion 18 forming an indentation bounded by an arcuate line 19 substantially in the shape of an inverted V. The lower boundary 15 and upper boundary 17 of aperture 14 are vertically spaced apart by boundaries 20 and 21, which boundaries define a removable animal access means 22 of container 10. Boundaries 20 and 21 mark an opening extending in a horizonal direction from $\frac{3}{12}$ to $\frac{5}{12}$ of the perimeter of container 10.

When the container is made of metal, animal access means 22 is conveniently a scored or weakened metal strip, preferably removed by rolling around a key 23, in the manner indicated in Fig. 3. After removing the animal access means, the hopper portion 18 is formed by pushing the outer surface of the container inwardly, to provide a recess in the container. The aperture 14 formed by said recess provides access to the feed 24.

As provided in commerce, the container is filled with feed and sealed, and may have the appearance of an ordinary metal can. The animal access means 22 is removed, and aperture 14 is formed, preferably while the container is in the position shown in Figure 3, to avoid spilling the contents 24 of the container while forming the feeding station. The container is then inverted to the positions shown in Figures 1 and 2, whereby hopper portion 18 regulates the flow of feed 24 into feed trough portion 16, thus forming a self-dispensing feeding station.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. A self-dispensing feeding container comprising a top and bottom and vertical connecting sides, a substantially inverted deformable V-shaped indentation constituting a hopper portion having a lower edge, an upstanding feed trough portion having an upper edge located beneath said indentation, said upper and lower edges being vertically spaced apart and constituting a removable animal access means extending in a horizontal direction $\frac{3}{12}$ to $\frac{5}{12}$ of the perimeter of the container, whereby upon removal of said access means an inward pressure upon the deformable indentation forms a self-dispensing hopper and trough.

2. A self-dispensing feeding container comprising a cylindrical body having top and bottom closures and vertical connecting sides, a substantially inverted deformable V-shaped indentation constituting a hopper portion having a lower edge, an upstanding feed trough portion having an upper edge located beneath said indentation, said upper and lower edges being verticaly spaced apart and constituting a removable animal access means extending in a horizontal direction from $\frac{3}{12}$ to $\frac{5}{12}$ of the perimeter of the container, whereby upon removal of the access means an inward pressure upon the deformable indentation forms a self-dispensing hopper and trough.

3. A self-dispensing feeding container comprising a cylindrical metal body having a top and bottom and vertical connecting sides, a substantially inverted deformable V-shaped indentation constituting a hopper portion having a lower edge, an upstanding feed trough portion having an upper edge located beneath said indentation, said upper and lower edges being vertically spaced apart and constituting a removable animal access means extending in a horizontal direction from $\frac{3}{12}$ to $\frac{5}{12}$ of the perimeter of the container, whereby upon removal of the access means an inward pressure upon the deformable indentation forms a self-dispensing hopper and trough.

4. A self-dispensing feeding container for dispensing poison bait, comprising a sealed top and bottom and vertical connecting sides, a substantially inverted deformable V-shaped indentation constituting a hopper portion having a lower edge, an upstanding feed trough portion having an upper edge located beneath said indentation, said upper and lower edges being vertically spaced apart and constituting a removable animal access means extending in a horizontal direction from $\frac{3}{12}$ to $\frac{5}{12}$ of the perimeter of the container, said removable access means constituting a scored section in the side wall of said container, whereby upon removal of the access means an inward pressure upon the deformable indentation forms a self-dispensing hopper and trough for said poison bait.

References Cited in the file of this patent

UNITED STATES PATENTS

| | | |
|---|---|---|
| 1,433,477 | Ritchie | Oct. 24, 1922 |
| 1,568,437 | Bach | Jan. 5, 1926 |
| 1,713,067 | Bach | May 14, 1929 |
| 2,666,415 | Scruggs | Jan. 19, 1954 |
| 2,705,938 | Greenough | Apr. 12, 1955 |